July 14, 1953

R. B. DODDS 2,645,345

GRAIN ASPIRATING MACHINE

Filed Sept. 9, 1950

INVENTOR
Robert B. Dodds
BY
Watson Johnson Leavenworth + Blair
ATTORNEYS

July 14, 1953    R. B. DODDS    2,645,345
GRAIN ASPIRATING MACHINE
Filed Sept. 9, 1950    4 Sheets-Sheet 3

INVENTOR
Robert B. Dodds
BY
Watson, Johnson, Leavenworth & Blair
ATTORNEYS

INVENTOR
Robert B. Dodds
BY
Watson, Johnson,
Leavenworth + Blair
ATTORNEYS

Patented July 14, 1953

2,645,345

UNITED STATES PATENT OFFICE 2,645,345

GRAIN ASPIRATING MACHINE

Robert B. Dodds, Woodbridge, Conn., assignor to The Safety Car Heating and Lighting Company, Inc., New Haven, Conn., a corporation of Delaware Application September 9, 1950, Serial No. 183,972

6 Claims. (Cl. 209—138)

This invention relates to an apparatus for aspirating milled cereal grains or the like. More particularly, the invention relates to an aspirator wherein a stream of air is used to remove hull particles, insect fragments and the like from cereal grains immediately after the milling thereof.

In the early stages of the milling process, e. g. where wheat is being milled into flour, the whole grain is subjected to what is conventionally termed a series of break operations. Thus, after the whole grain has been thoroughly cleansed and tempered, it is treated in roll mills, and more recently by centrifugal impact mills, to the end of breaking the individual kernels, in order to separate the endosperm and germ portions of the kernel from its hull. During the early break operations, the hull particles are relatively large, although there are, of course, produced relatively small hull particles which are desirably removed from the endosperm and germ as expeditiously as possible, in order to preclude the milling of these hull particles into bran flour, together with the endosperm.

In accordance with my invention, and to the end of removing from the mill stream at an early stage thereof hull particles and impurities, I treat the whole grain in the pre-break and break operations, for example, by feeding it into a treatment zone wherein the individual grain particles are centrifugally flung at high velocity in a uniform highly dispersed condition against impact surfaces which break open the kernels along the lines of least cleavage and dislodge the germ from its kernel. Progressive treatments separate or break away the endosperm from the hull. While the stream is in this uniform highly dispersed condition, I subject it to the aspirating action of a uniform flow of air which passes through the product stream at a carefully predetermined volume and velocity to lift from the product stream the lighter weight hull particles, and any entrained light-weight impurities, while, at the same time, permitting the heavier endosperm and germ particles to fall into a collecting hopper. In so doing, I immediately remove from the main stream at each break operation many undesirable constituents, which are accordingly confined with a small amount of good stock that can be subsequently treated as desired.

In many known aspirators of the type under consideration, the exhaust conduit for air is for practical reasons desirably located at one side of the outer cylindrical casing of the aspirator. This arrangement results in inefficient aspiration of the product because, by virtue of air seeking the path of least resistance, the air stream on the same side as the exhaust conduit is of higher velocity than the stream on the opposite side. The variation in velocity through the air channel causes irregular aspirating around the base of the cone because, where velocity is high, good stock as well as impurities are lifted up the air channel, while at low velocity points insufficient aspiration permits impurities to flow through with the good stock.

Thus these structural characteristics, which give rise to non-uniform air conditions, make it impossible to aspirate grain thoroughly and efficiently. It is therefore among the objects of my invention to provide both an apparatus for and a method of breaking the whole grain which eliminates the foregoing difficulties as well as others, in a thoroughly practical and efficient manner.

In the drawings, in which is shown one embodiment of my invention,

Similar reference characters refer to similar parts throughout the several views of the drawing.

The aspirator, which receives the broken grain from the impact mill is preferably constructed of a number of coacting units which, when assembled, provide a means of passing grain vertically downward across an aspirating gap while a uniform counter-current of air passes through the gap and filters the grain, carrying away the relatively lightweight impurities. A baffle structure is placed in the air stream below its discharge point but above the aspirating gap to obstruct the air stream in such a way as to effect uniform air conditions at the gap and non-turbulent air conditions between the gap and the exhaust conduit. This results in uniform and efficient treatment of the grain by air.

Figure 1:
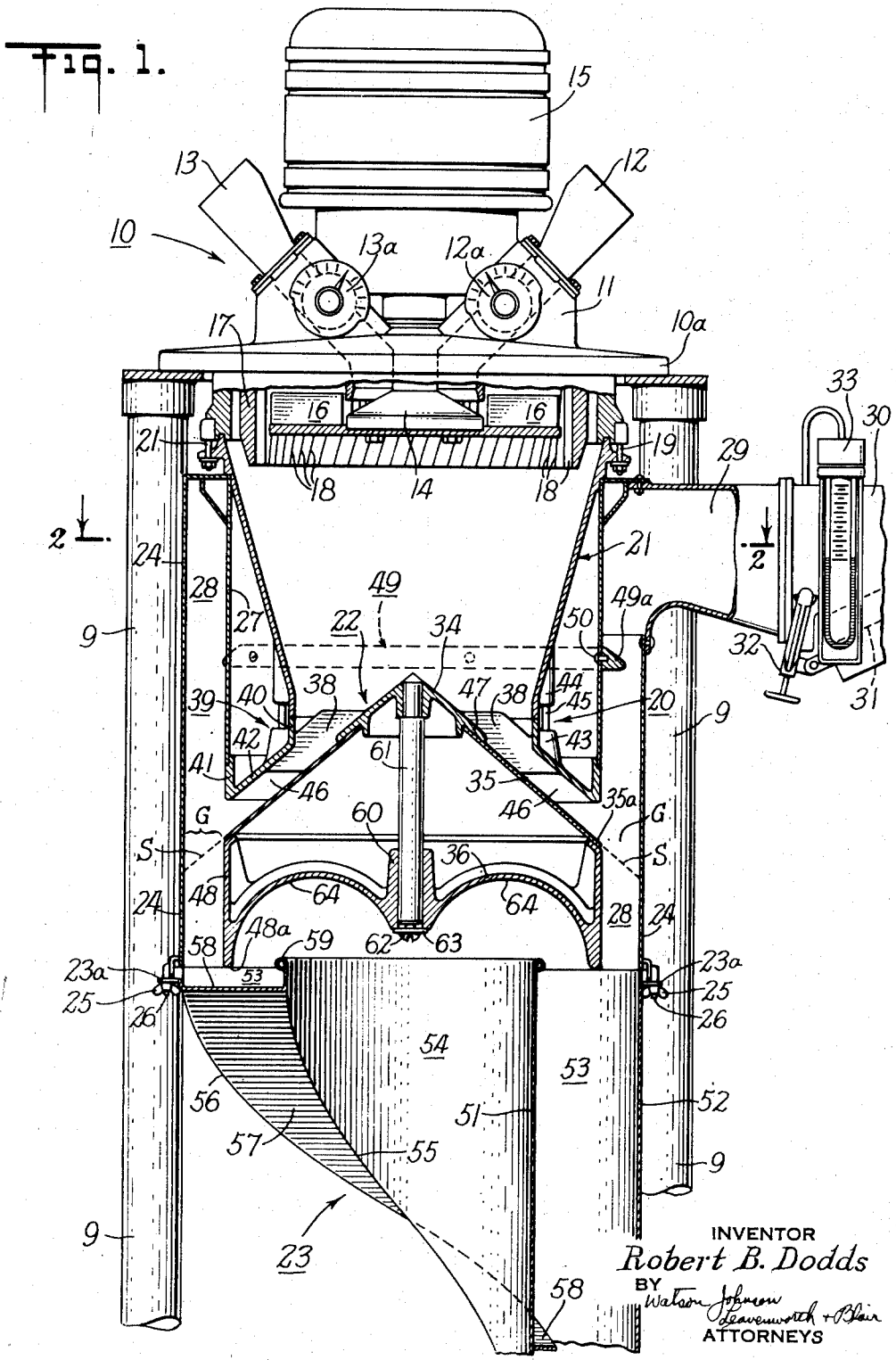
Figure 1 is a fragmentary front elevation of my milling machine with certain parts cut away and shown in section.

Referring now to Figure 1 of the drawing, the impact mill portion of the machine is generally indicated at 10 and includes a casing 11 having a pair of inlets 12 and 13 through which the product flows into the casing, the casing including a base flange 10a which rests on legs 9. These inlets are provided respectively with valves 12a and 13a, whereby the rate of flow of the product through the inlets to the casing may be controlled as desired. A rotor 14 is rotatably mounted within casing 11, and is driven by a motor 15. This rotor is also disposed in casing 11 in respect to inlets 12 and 13, as to receive therefrom the inflowing product. Rotor 14 has fastened thereto in planes passing through its axis a plurality of vanes or blades 16 which, upon rotation, impel the product particles outwardly of the rotor axis. An impact liner 17 is detachably mounted within the casing around the periphery of rotor 14, and this liner is provided with angularly disposed impact surfaces against which the product particles are impelled and broken, the products of this breakage being directed downwardly from the liner into an inwardly tapering frustoconical shell, generally indicated at 21.

The function of impact liner 17 is two fold. First of all, it stops each high velocity particle, thus causing the elastic limit of the particle, e. g. a wheat grain, to be exceeded, and a fracture is accordingly accomplished along lines of least resistance, i. e. the particles or kernels are broken down along lines of natural division or lines of least cleavage. Secondly, by virtue of the angular relation of the impact surfaces of the liner to the resultant velocity of the particles, the liner provides for the quick removal of the broken material so that oncoming particles will strike only a clear surface and not be cushioned by the broken product. These impact surfaces 18 of liner 17 are provided by corrugations on the inner periphery of the liner, the impact faces of the corrugations being inclined from the vertical at such an angle to the resultant velocity of the particles as to cause the particles to strike the surface obliquely. Thus the fragments are directed downwardly and outwardly of the rotor, thereby clearing the way for oncoming particles. Thus the only friction the particles encounter on this type of breaking occurs during the acceleration of the particles along rotor blades 16, as neither the particles nor the fragments thereof can bounce back into the rotor or into the oncoming stream of particles being impelled by the rotor. For a more detailed description of the construction and operation of impact mill 10, reference is made to the copending application of Robert B. Dodds and Arthur N. Hibbs, Serial No. 95,444, filed May 26, 1949.

It may accordingly be seen that as a result of the impacting action in impact mill 10, the whole grain, such as wheat grains, are fractured along lines of least resistance, usually at the crease in the first instance, and this action releases crease dirt and other particles of foreign material that may be entrained in the product stream. Of course, hull portions of varying size are broken loose from the endosperm, the endosperm also being broken into particles of various sizes and the whole germ is liberated. Thus, this conglomeration of material from impact mill 10 flows into the receiving shell 21 with perhaps a slight swirling trajectory, most of the material, however, flowing generally vertically downward by reason of the corrugations on the inner surface of liner 17. There may be, however, a small amount of cyclonic action or movement of the material which is desirably arrested prior to aspiration of the material in a manner to be described hereinafter.

The aspirator, generally indicated at 20, is detachably suspended from base 10a of mill 10 as by bolts 19, and comprises in general three separate detachably related sections, namely an upper funnel, generally indicated at 21, a central cone, generally indicated at 22, and a lower collecting hopper and air inlet, generally indicated at 23.

An outer casing or cylinder 24 is fastened in any suitable manner to the upper end of funnel 21 and completely surrounds the funnel and central cone 22. Cone 22 is detachably fastened to funnel 21 in a manner to be described. Hopper 23 is detachably fastened to the bottom of outer casing 24 by wing nuts 25 threaded on bolts 26 secured to the periphery of the casing at its bottom edge and extending through a flange 23a on hopper 23. It may now be seen that funnel 21, cone 22 and hopper 23 are detachably connected to one another and as a unit to mill base 10a, thus facilitating not only initial assembly of these units, but also rendering subsequent disassembly an easy matter should it become necessary for purposes of repair, replacement or cleansing. This construction furthermore provides an airtight apparatus through which air may flow upwardly and the product downwardly during the aspirating action.

Between casing 24 and funnel 21 is disposed a cylindrical partition 27 which is so constructed as to provide a wall concentric with casing 24. This partition 27 is secured to the top of funnel 21 and to a portion of the cone unit 22 in any suitable manner and forms with casing 24 the upper portion of an annular air passage 28. An air outlet conduit 29 is connected to the upper end of passage 28 at one side thereof and leads to a conduit 30 connected to a suction fan (not shown). A valve 31, adjustable by way of a lever 32, and a manometer 33 are disposed in conduit 30, as is shown in Figure 1. Valve 31 may be manipulated as desired to control the velocity of air flowing through passage 28.

Cone 22 comprises essentially three parts, namely, a conical head 34, a frustoconical shell 35 and an air distributor 36. Head 34 is preferably an integral casting axially aligned with rotor 14. Integral with and extending radially from head 34 are a plurality of fin-like baffles 38 (see also Figure 2) which extend downwardly and outwardly of the head and act to arrest any swirling or cyclonic action of the material discharged from funnel 21 so that such material flows downwardly in thin, unidirectional streams over the upper surface of shell 35. Cast integrally with baffles 38 is a surrounding shell, generally indicated at 39, comprising upper and lower cylindrical portions 40 and 41, and a connecting flange 42. Portion 40 is of the same diameter as the lower end of funnel 21, while lower portion 41 is of the same diameter as cylindrical partition 27. Shell 39 and funnel 21 have aligned bosses 43 and 44, which receive elongated bolts 45 by which the shell is secured to the bottom of the funnel. Thus head 34 provides a support and attachment for the lower end of partition 27. Flange 42 of shell 39 also forms with shell 35 a frustoconical passage 46 down which the product flows toward passage 28.

The upper edge of shell 35 is secured in any suitable manner to the underside of a flange 47 at the bottom of head 34, and the lower edge 35a of shell 35 is suitably secured to the upper edge of cylindrical portion 48 of air distributor 36. This cylindrical portion 48 of the air distributor forms with the lower portion of casing 24 the lower end of annular air passage 28.

Lower edge 35a of shell 35, and the opposite side of casing 24 constitute an aspirating gap G, across which the treated product stream S flows during the aspirating operation. This stream S is of uniform thickness and is preferably of such density that the upward flow of air through passage 28 can readily pass therethrough and aspirate therefrom the lighter weight constituents of stream S which are exhausted from the aspirator by way of outlet 29 and conduit 30. Hence, air flows through aspirating gap G and accordingly through product stream S in a uniform manner and at a constant velocity, at all portions of the gap, this constant velocity being attained in a manner now to be described.

Most commercial aspirators with which I am familiar have their exhaust ducts located asymmetrically, i. e. the exhaust duct is usually located at the top and at one side of the aspirator similar to the location of duct 29. By reason of such asymmetrical and non-concentric location of the duct, non-uniform air conditions prevail at the aspirating gap. Thus at certain portions of the gap, e. g. those nearest the exhaust duct, the air velocity is greater than that at more remote portions of the gap. Consequently, if the velocity is adequate at the remote portions of the gap to remove the lighter weight impurities from the stream, the velocity at the nearer portions of the gap will be so excessive as to remove good stock from the stream, thus causing waste, as the material removed from the aspirator is usually fed into tailings, or, if not, must be further processed to separate out the good stock. That is, of course, costly. On the other hand, if the air velocity at those portions of the gap nearest the exhaust duct is just sufficient to remove the impurities, the air velocity at the more remote portions of the gap is inadequate to remove all of the impurities which accordingly flow with the good stock into the discharge hopper and continue in the millstream. Accordingly, it is important to maintain uniform air conditions at all portions of the aspirating gap so that only the light-weight particles are aspirated out, while practically all of the good stock falls into the discharge hopper.

Figure 2:
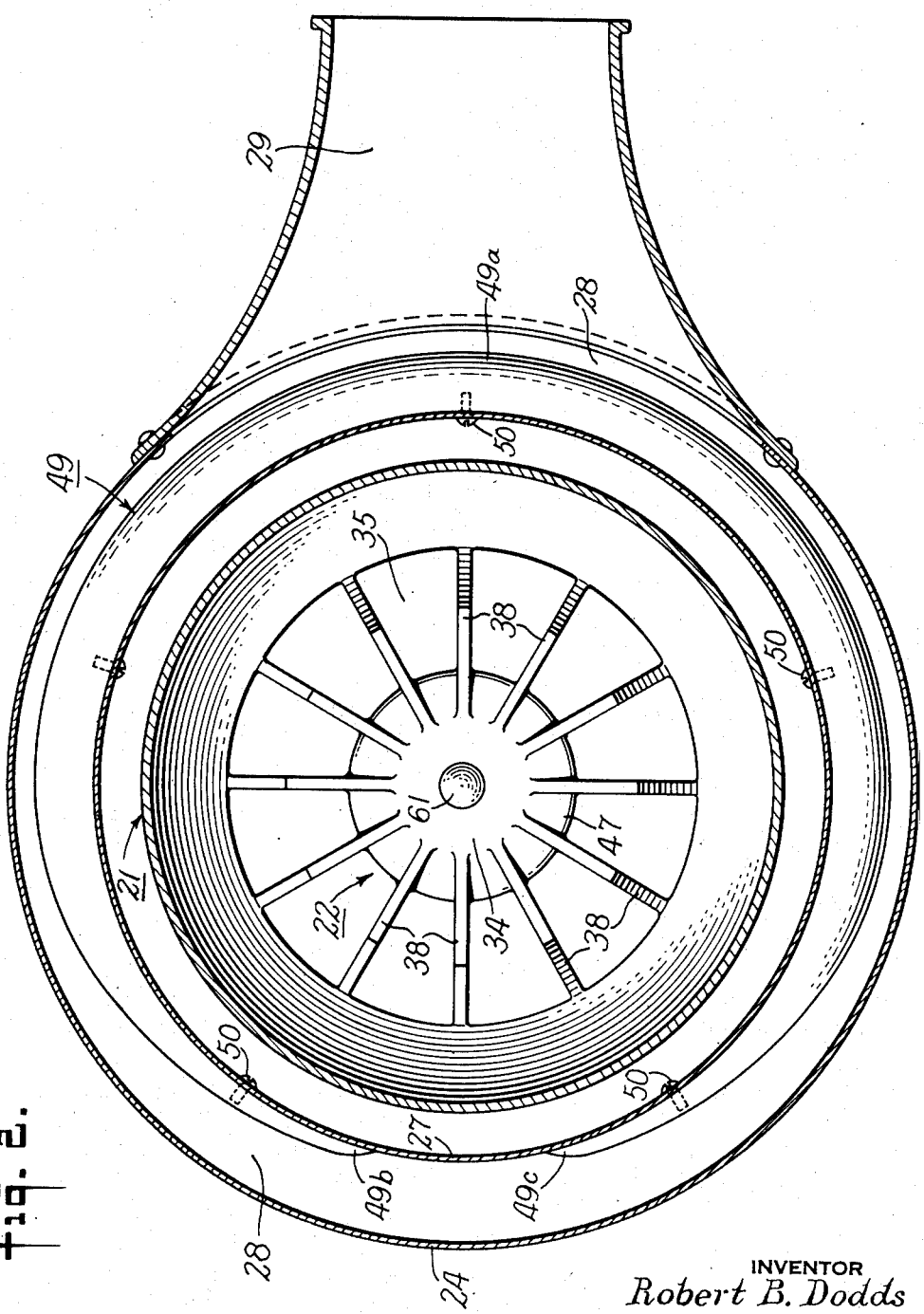
Figure 2 is an enlarged horizontal cross-sectional view taken along the line 2—2 in Figure 1.

To attain uniform air conditions at gap G, there is disposed above the gap and substantially encircling partition 27 a baffle, generally indicated at 49 (see also Figure 2). This baffle is disposed just below the entrance to outlet duct 29 and extends into and variably blocks air passage 28. Thus as shown in Figure 2, baffle 49 may be somewhat in the nature of an eccentric ring, fastened to partition 27 by screws 50. The thickest portion 49a of the baffle is juxtaposed to the entrance of outlet duct 29, while the thinnest portions 49b and 49c of the baffle are diametrically opposed to the entrance of duct 29. The thickness of baffle 29 decreases from portion 49a thereof to portions 49b and 49c, and thus variably blocks annular air passage 28. Baffle 49 may, under certain circumstances, diminish in thickness in a uniform manner, and under other circumstances may be of substantially constant thickness for 180°, and thereafter taper off to the ends of the baffle. The manner in which the thickness of the baffle diminishes depends on different applications and the circumstances of the milling operation involved. Preferably the thickness of the baffle is uniform at all portions thereof adjacent outlet 29. The resistance to air flow through passage 28 is accordingly increased at the point of maximum velocity, namely just below outlet 29, so that relatively less air is allowed to flow past this point, while the opposite side of passage 28 is substantially unobstructed, permitting relatively more air to flow along this side. The air velocity at gap G is accordingly substantially uniform throughout the periphery thereof, making possible substantially complete removal of light-weight impurities from the product.

Thus, through the use of this method of establishing and maintaining uniform air conditions, I have found that it is possible to handle a large amount of bulk products in a continuous operation. For example, I have found it feasible to exhaust air through outlet 29 at rates varying from 100 C. F. M. to 1500 C. F. M. and still maintain conditions of substantially uniform velocity and minimum turbulence. The volume of air to be used will, of course, vary with the product to be treated and with the rate at which the product is charged through tubes 12 and 13.

As a practical matter, the volume of air passing through the aspirator can be varied within wide limits without altering the uniformity of aspirating action which results from the use of apparatus designed in accordance with my invention. Because of this, it is possible to employ the same equipment in treating a variety of bulk products, each of which requires a particular rate of flow of both product and air. The versatility of the basic equipment is further enhanced through the provision of valves 12a and 13a, by which the rate of product flow can readily be adjusted. Also contributing to the machine's versatility is the provision of the adjustable valve or damper 31 in exhaust conduit 30. Thus by judicious setting of valves 12a, 13a and 31, the machine is readily adapted to the aspiration of a wide range of flowable bulk products.

Figure 3:
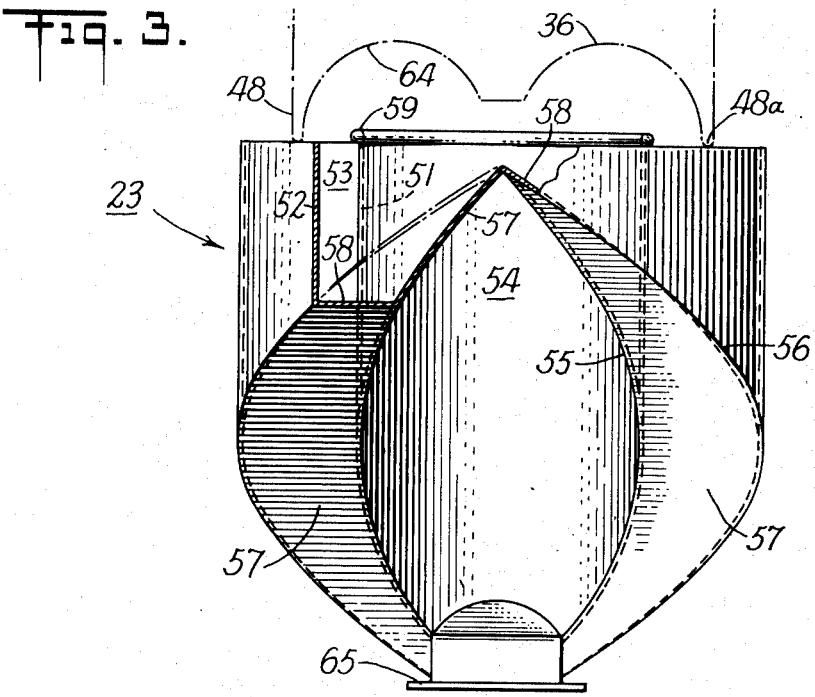
Figure 3 is a sectional elevation of the air inlet passage and the discharge hopper.

In aspirators of the character under consideration, it is important that the air being sucked into the aspirator flows in a uniform and evenly distributed stream with the air inlet being so arranged relative to the aspirated product discharge that none of the product is lost by flowing into the air inlet. To this end, I have provided air distributor 36 and the product discharge hopper and air inlet structure shown in Figures 1, 3 and 4.

As shown in Figure 1, discharge hopper and air inlet 23 concentrically underlie air passage 28 and air distributor 36. As is more clearly shown in Figure 3, the hopper portion of the unit 23 is formed by inner and outer cylindrical shells 51 and 52. These shells are concentrically arranged and provide a discharge passage 53 therebetween, the inner shell 51 forming an air inlet passage 54.

Figure 4:
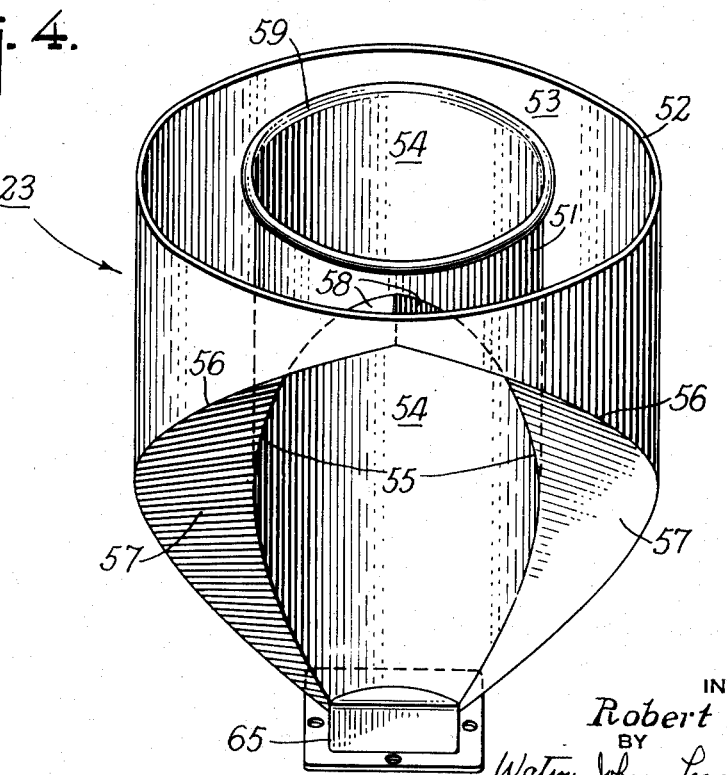
Figure 4 is a perspective view of the air inlet and discharge hopper.
Figure 5:
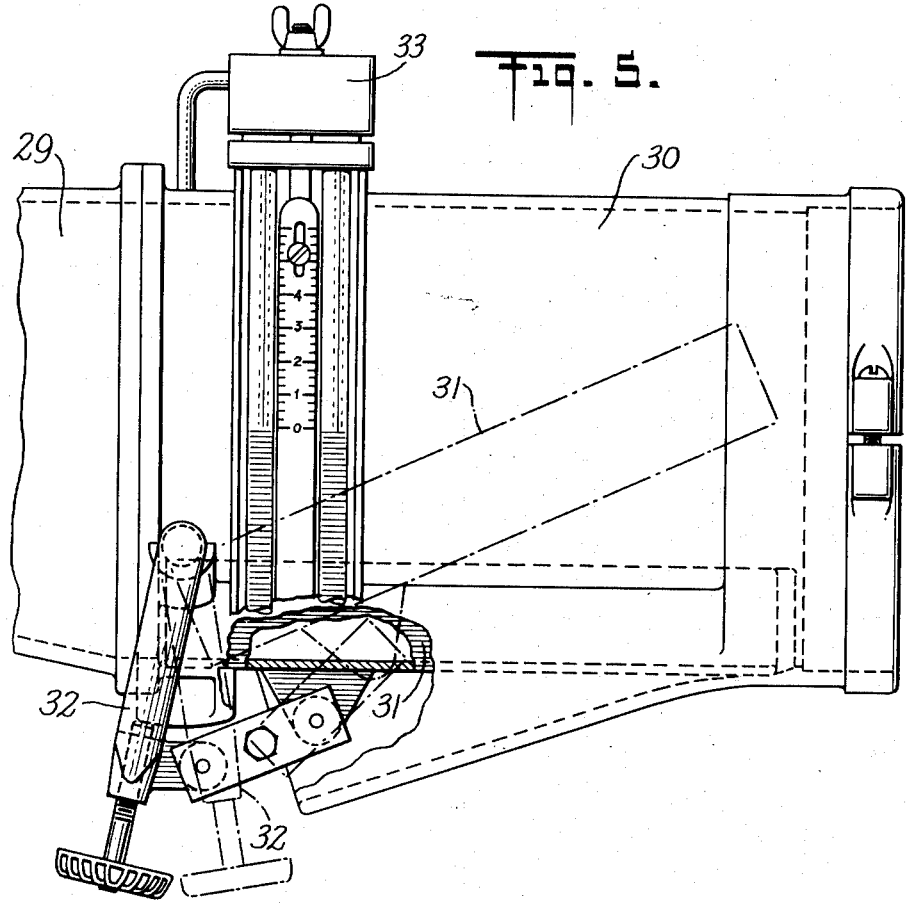
Figure 5 is an enlarged fragmentary elevation showing the exhaust air control valve; and, Figure 6 is a fragmentary front elevation of the product discharge hopper and air inlet.
Figure 6:
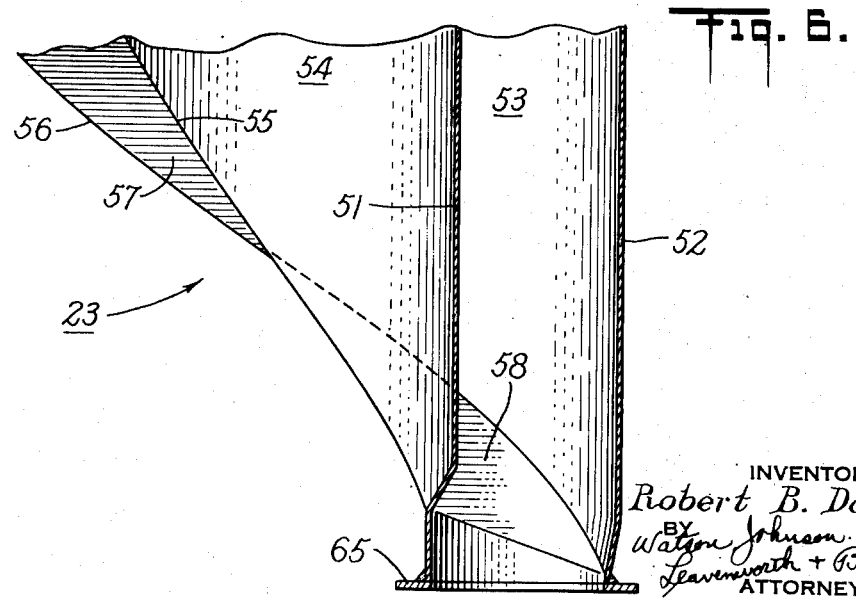

Inner shell 51 has a generally elongated ovate opening 55 formed therein, the width of this opening preferably substantially equaling the diameter of shell 51; the outer shell 52 is cut away as at 56. A somewhat helical-shaped strip of sheet metal 57 has its respective edges welded to the edges of openings 55 and 56, respectively, this strip accordingly forming a sharply descending path or ramp 58 within discharge passage 53. Thus, the aspirated product falling into the upper end of discharge passage 53 from the bottom of passage 28 (Figure 1) flows downwardly over ramp 58 to any suitable discharge conduit 65 (Figure 4). At the same time, air is free to flow without turbulence through opening 55 into air passage 54 to air distributor 36 (Figure 1). Through the provision of the large symmetrical opening 55 and the concentricity of air passage 54, any type of air desired by the miller can be piped directly to the opening. For example, if humid air is prerequisite, a pipe leading from that portion of the mill where humid air is discharged is readily installable to lead to opening 55.

Air distributor 36 is preferably an integral casting having a centrally disposed hollow boss 60 which receives an elongated stud 61 whose upper end may be secured in any suitable manner to head 34. A screw 62 bears against a washer 63 seated against distributor 36, and is threaded into the lower end of stud 61, thus securing the air distributor in proper position.

The bottom of distributor 36 has a generally annular dome-like formation 64 that curves smoothly from the center of the distributor to the bottom edge 48a of cylindrical portion 48. This edge 48a overlies the annular entrance of product discharge outlet 53 so that the circular exit end 59 of air inlet 54 lies well within the edge 48a. It should further be noted that circular edge 59 lies somewhat above bottom edge 48a. Thus, product flowing downwardly from gap G through the bottom of passage 28 passes directly into discharge passage 53 at a point below the entrance of air into distributor 36. By reason of the configuration of distributor dome 64, the air flows smoothly out of the distributor and downwardly under edge 48a into the bottom of passage 28. Hence it is impossible for any of the product particles to pass through the air distributor 36 and into air inlet 54. Thus there is assured a uniform flow of air into the bottom of passage 28, which combines with the structural features of the air passages described to preclude the passage of any product particles other than into discharge passage 53.

The over-all operation of the machine is as follows: The miller, knowing both the nature and the barrels per hour of the bulk product to be treated, sets the product flow control valves 12a and 13a and sets lever 32, thereby to adjust valve 31 in accordance with the cubic feet per minute of air desired. Product then flows through inlets 12 and 13 to rotor 14, wherein it is treated in the manner hereinbefore described. The broken product particles flow downwardly through funnel 21 to cone 22 where any residual cyclonic action is arrested by the baffles 38. The treated product flows downwardly in a unidirectional relatively slow moving stream over shell 35 and across aspirating gap G. At the same time, a uniform flow of air through passage 28 passes upwardly through the product stream S and removes therefrom all light-weight particles which are carried upwardly through passage 28 to outlet 29, from which they are exhausted by way of conduit 30. The aspirated product particles continue downwardly to passage 28 and fall into discharge passage 53, and thence to conduit 65 (Figure 4). The uniform air conditions at aspirating gap G substantially preclude removal of good stock, and at the same time preclude passage of impurities downwardly with the good stock.

Thus I have provided apparatus for aspirating grains or the like which attain the several objects set forth hereinabove in a thoroughly practical and efficient manner.

I claim:

1. In apparatus for aspirating a dry bulk product, the combination of, a pair of spaced concentric members forming an annular air channel, means forming an annular gap between the top and bottom of said channel across which the product is adapted to flow in a thin, flat stream, means to direct the product to said gap, means forming an air inlet opening connected to the bottom of said channel, an exhaust conduit connected to the upper end of said channel at one side thereof, and a horizontal baffle element connected to one of said members and being wholly disposed in said channel between said inlet opening and said exhaust conduit, said baffle element including a relatively wider horizontal portion than the other portions thereof, said wider portion being disposed in the exhaust conduit side of said channel thereby to reduce the air velocity at those portions of said gap underlying said wider portion of said baffle element.

2. In apparatus for aspirating a dry bulk product, the combination of, a pair of spaced concentric members forming an annular air channel, means forming an annular gap between the top and bottom of said channel across which the product is adapted to flow in a thin, flat stream, means to direct the product to said gap, means forming an air inlet opening connected to the bottom of said channel, an exhaust conduit connected to the upper end of said channel at one side thereof, said annular air channel being of uniform diameter throughout, and a horizontal baffle element connected to one of said members and being wholly disposed in said channel between said inlet opening and said exhaust conduit, said baffle element including a relatively wider horizontal portion than the other portions thereof, said wider portion being disposed in the exhaust conduit side of said channel thereby to reduce the air velocity at those portions of said gap underlying said wider portion of said baffle element.

3. In apparatus for aspirating a dry bulk product, the combination of, a pair of spaced concentric members forming an annular air channel, means forming an annular gap between the top and bottom of said channel across which the product is adapted to flow in a thin flat stream, means to direct the product to said gap, said means including a plurality of radially extending members positioned to arrest any rotary movement of the flowing product as it flows to said gap, means forming an air inlet opening connected to the bottom of said channel, an exhaust conduit connected to the upper end of said channel, and a baffle element connected to one of said members and being wholly disposed in said channel between said inlet opening and said exhaust conduit and lying generally in a horizontal plane, said baffle element comprising an annular concentric ring-like member having a wider horizontal portion disposed in said channel beneath said exhaust conduit thereby to reduce the air velocity at those portions of said gap underlying said wider portion of said baffle element and the thinnest portions of said baffle being disposed in the opposite side of said channel.

4. In apparatus for aspirating a dry bulk product, the combination of, upper and lower coaxially positioned members having a cylindrical outer surface, said members having opposed spaced lower and upper surfaces to provide a passage for the flow of product introduced into the upper member, an outer member concentric with said upper and lower members and spaced therefrom so as to form therewith an annular air channel, said outer member forming with a portion of said inner member an annular aspirating gap between the top and bottom of said channel across which the product is adapted to flow from said passage in a thin flat stream, an exhaust conduit connected to the upper end of said channel, and a horizontal and generally circular baffle of varying width connected to one of said members and wholly disposed in said channel between the inlet and outlet ends thereof.

5. Apparatus according to claim 4 wherein the lower portion of said lower member constitutes an air distributor having an annular curved surface with downwardly extending portions overlying said air inlet to direct air flowing through said inlet uniformly into the bottom of said annular air channel.

6. In apparatus for aspirating a dry bulk product, the combination of, upper and lower coaxially positioned members having a cylindrical outer surface, said members having opposed spaced lower and upper surfaces to provide a passage for the flow of product introduced into the upper member, an outer member concentric with said upper and lower members and spaced therefrom so as to form therewith an annular air channel, said outer member forming with a portion of said inner member an annular aspirating gap between the top and bottom of said channel across which the product is adapted to flow from said passage in a thin flat stream, means forming an air inlet opening connected to the bottom of said channel, an exhaust conduit connected to the upper end of said channel at one side thereof, and a horizontal baffle arrangement connected to one of said members and wholly disposed in said channel between the inlet and outlet ends thereof, said baffle element including a relatively wider horizontal portion than the other portions thereof, said wider portion being disposed in the exhaust conduit side of said channel thereby to reduce the air velocity at those portions of said gap underlying said wider portion of said baffle element.

ROBERT B. DODDS.

References Cited in the file of this patent

UNITED STATES PATENTS

| Number | Name | Date |
|---|---|---|
| 466,962 | Hunter | Jan. 12, 1892 |
| 492,720 | Frey | Feb. 28, 1893 |
| 940,469 | Middleton | Nov. 16, 1909 |
| 1,666,477 | Stebbins | Apr. 17, 1928 |
| 2,099,505 | Weaver | Nov. 16, 1937 |
| 2,392,365 | Carter | Jan. 8, 1946 |
| 2,417,078 | Jones | Mar. 11, 1947 |
| 2,428,670 | Hulse | Oct. 7, 1947 |
| 2,435,927 | Manning | Feb. 10, 1948 |
| 2,464,212 | Carter et al. | Mar. 15, 1949 |
| 2,529,679 | Dodds | Nov. 14, 1950 |

FOREIGN PATENTS

| Number | Country | Date |
|---|---|---|
| 351,129 | Great Britain | June 25, 1931 |
| 688,169 | Germany | Feb. 14, 1940 |

OTHER REFERENCES

Nyiri Serial No. 355,397, published May 4, 1943 by A. P. C.